(12) United States Patent
Yoshida

(10) Patent No.: US 7,516,989 B2
(45) Date of Patent: Apr. 14, 2009

(54) PIPING CONNECTOR AND METHOD OF FABRICATING THE SAME

(75) Inventor: Naoki Yoshida, Kanagawa (JP)

(73) Assignee: Piolax, Inc., Yokohama-shi (JP)

( * ) Notice: Subject to any disclaimer, the term of this patent is extended or adjusted under 35 U.S.C. 154(b) by 378 days.

(21) Appl. No.: 10/814,329

(22) Filed: Apr. 1, 2004

(65) Prior Publication Data
US 2004/0183301 A1    Sep. 23, 2004

(51) Int. Cl.
*F16L 37/088*   (2006.01)
(52) U.S. Cl. ........................ 285/321; 285/348
(58) Field of Classification Search ............... 285/319, 285/321, 348, 379
See application file for complete search history.

(56) References Cited

U.S. PATENT DOCUMENTS

| 3,314,696 | A | * | 4/1967 | Ferguson et al. ........ 285/148.14 |
|---|---|---|---|---|
| 4,423,891 | A | * | 1/1984 | Menges ...................... 285/305 |
| 4,640,534 | A | * | 2/1987 | Hoskins et al. ........... 285/143.1 |
| 4,725,081 | A | * | 2/1988 | Bauer ......................... 285/305 |
| 4,813,716 | A | * | 3/1989 | Lalikos et al. .......... 285/148.14 |
| 4,874,174 | A | * | 10/1989 | Kojima et al. ................. 285/82 |
| 4,884,829 | A | * | 12/1989 | Funk et al. ..................... 285/24 |
| 4,909,706 | A | * | 3/1990 | Bergsten et al. .......... 415/172.1 |
| 4,911,406 | A | * | 3/1990 | Attwood .................... 251/148 |
| 5,462,313 | A | * | 10/1995 | Rea et al. .................... 285/21.1 |
| 5,749,606 | A | * | 5/1998 | Lu et al. ........................ 285/86 |
| 5,909,901 | A | * | 6/1999 | Zillig et al. .................... 285/38 |
| 5,979,946 | A | * | 11/1999 | Petersen et al. .............. 285/305 |
| 6,371,528 | B1 | * | 4/2002 | Kimura ....................... 285/305 |
| 6,464,266 | B1 | * | 10/2002 | O'Neill et al. .............. 285/340 |
| 6,474,698 | B2 | * | 11/2002 | Dobler et al. ............... 285/321 |
| 6,554,322 | B2 | * | 4/2003 | Duong et al. ................ 285/305 |
| 6,769,720 | B2 | * | 8/2004 | Dahms et al. ............... 285/308 |
| 6,899,094 | B1 | * | 5/2005 | Li ............................... 126/41 R |
| 6,983,958 | B2 | * | 1/2006 | Rautureau ................... 285/305 |
| 6,997,486 | B2 | * | 2/2006 | Milhas ........................ 285/305 |
| 2003/0111840 | A1 | * | 6/2003 | O'Neill et al. .............. 285/340 |
| 2004/0041394 | A1 | * | 3/2004 | Dahms et al. ................. 285/39 |

FOREIGN PATENT DOCUMENTS

| JP | 06221479 A | * | 8/1994 |
|---|---|---|---|
| JP | 08-075001 | | 3/1996 |
| JP | 10-9470 | | 1/1998 |
| JP | 2000-326414 | | 11/2000 |
| JP | 2003-021287 | * | 1/2003 |

* cited by examiner

*Primary Examiner*—James M Hewitt
(74) *Attorney, Agent, or Firm*—McGinn IP Law Group, PLLC

(57) ABSTRACT

A pipe connector for connecting a first pipe and a second pipe includes a socket attached to an end of the first pipe and a plug attached to an end of the second pipe, wherein the plug is inserted into the socket. An inner periphery of the socket is provided with a seal ring for sealing an interval between the inner periphery of the socket and an outer periphery of the plug in an airtight manner and a hold ring for restricting movement of the seal ring in an axial direction. The hold ring includes a groove in a ring-like shape for constituting a burr storing space at an outer periphery thereof and is welded to the inner periphery of the socket by ultrasonic welding.

19 Claims, 4 Drawing Sheets

PIPING CONNECTOR AND METHOD OF FABRICATING THE SAME

BACKGROUND OF THE INVENTION

1. Field of the Invention

The present invention relates to a piping connector preferably used in a fluid pipe in, for example, a cooling system or an intake system of an engine of an automobile.

2. Description of the Related Art

In connecting to, for example, a radiator hose or the like of an automobile, there is widely utilized a piping connector (pipe joint) made to be connected in one touch motion by only inserting a plug attached to an end portion of other pipe into a socket attached to an end portion of one pipe.

For example, in JP-A-10-9470, there is disclosed such a piping connector in which an outer peripheral groove is provided at an outer periphery of a female pipe (socket), the outer peripheral grove is provided with notched grooves penetrating inner and outer diameters and opposed to each other by a necessary angle, a stop piece arm (stopper) is engaged with a valley peripheral diameter portion of an unnotched groove portion, respective locking arms extended from the stop piece arm are made to span the respective notched grooves to lock, and portions of the respective locking arms are projected into the female pipe and fit to a groove at an outer periphery of a male pipe (plug).

Such a piping connector is arranged with a seal ring between an inner periphery of the socket and an outer periphery of the plug in order to seal in airtight such that a fluid flowing at inside of a pipe does not leak in a state of connecting the connector.

The seal ring is mounted to a ring-like groove portion constituted by a ring-like stepped portion provided on a depth side of the socket and a hold ring provided on a side of an opening portion at a predetermined interval from the stepped portion. The hold ring is fixedly attached to the inner periphery of the socket by a method of fitting, press-fit or the like.

However, according to the method of fixedly attaching the hold ring to the inner periphery of the socket by fitting or press-fit, when a fluid at high temperature and high pressure is made to flow to inside of the connected pipe, there is a concern that the hold ring is detached by loosening fitting or press-fit.

Further, although it is also considerable to weld the hold ring to the inner periphery of the socket, particularly in the case of ultrasonic welding, a molten resin is extruded from a weld face to produce burrs and therefore, there is a concern that the burrs are brought into contact with the seal ring to damage the seal ring.

SUMMARY OF THE INVENTION

It is an object of the invention to provide a piping connector made to be able to fixedly attach solidly to an inner periphery of a socket without damaging a seal ring and a method of fabricating the same.

In order to achieve the above-described object, a first of the invention provides a piping connector characterized in including a socket substantially in a tubular shape attached to an end of one pipe to be connected, a plug substantially in a tubular shape attached to an end of other pipe, a seal ring arranged at an inner periphery of the socket for sealing an interval between the inner periphery of the socket and an outer periphery of the plug in airtight, and a hold ring fixedly attached to the inner periphery of the socket for restricting the seal ring from moving in an axial direction, in which the pair of pipes are connected by inserting the plug to fit to the socket, wherein the hold ring includes a groove in a ring-like shape for constituting a burr storing space at an outer periphery thereof and is welded to the inner periphery of the socket by ultrasonic welding.

According to the invention, the groove in the ring-like shape for constituting the burr storing space is formed at the outer periphery of the hold ring and therefore, burrs produced when the hold ring is subjected ultrasonic welding are stored at inside of the groove in the ring-like shape and prevented from flowing out to an outer portion and therefore, it can be prevented that burrs flowing out to the side of the seal ring to damage the seal ring and the hold ring can fixedly be attached solidly to the inner periphery of the socket by welding.

A second of the invention provides the piping connector, wherein in the ultrasonic welding, a portion of the hold ring pressed to the inner periphery of the socket is constituted by a corner portion faced in a curved shape having a radius of curvature of 0.2 through 0.5 mm in the first invention.

According to the invention, the portion of the hold ring pressed to the inner periphery of the socket in ultrasonic welding is constituted by the corner portion faced to the shape of the curved face having the radius of curvature of 0.2 through 0.5 mm and therefore, the portion pressed to the inner periphery of the socket is not chipped, the seal ring can be prevented form being damaged by debris, the vibration energy is not dispersed and therefore, the welding can be carried out smoothly.

A third of the invention provides the piping connector, wherein the inner periphery of the socket is provided with a first diameter contracted portion and a second diameter contracted portion from a side of an inserting port of the plug, the press ring is pressed to the first diameter contracted portion to weld and a stepped portion for constituting a stopper and a burr stopper in welding the hold ring is formed between the first diameter contracted portion and the second diameter contracted portion in the first or the second invention.

According to the invention, in subjecting the hold ring to ultrasonic welding, the hold ring is pressed to the first diameter contracted portion to weld, burrs produced there are stopped by the stepped portion between the first diameter contracted portion and the second diameter contracted portion and sealed at inside of the groove in the ring-like shape and therefore, the burrs can firmly be prevented from flowing out to a side of the seal ring. Further, the stepped portion also constitutes a stopper for stopping movement of the hold ring in ultrasonic welding of the hold ring to also contribute to positioning the hold ring.

A fourth of the invention provides a method of fabricating a piping connector characterized in a method of fabricating a piping connector including a socket substantially in a tubular shape attached to an end of one pipe to be connected, a plug substantially in a tubular shape attached to an end of other pipe, a seal ring arranged at an inner periphery of the socket for sealing an interval between the inner periphery of the socket and an outer periphery of the plug in airtight, and a hold ring fixedly attached to the inner periphery of the socket for restricting the seal ring from moving in an axial direction, in which the pair of pipes are connected by inserting the plug to fit to the socket, wherein the inner periphery of the socket is provided with a first diameter contracted portion and a second diameter contracted portion from a side of an inserting port of the plug, the hold ring is welded to the first diameter contracted portion by applying an ultrasonic wave to the hold ring while being pressed to the first diameter contracted portion, the ultrasonic wave is stopped from being applied before the hold ring is brought into contact with a stepped portion formed between the first diameter contracted portion and the second diameter contracted portion and thereafter, the hold ring is pressed further to be brought into contact with the stepped portion.

According to the invention, by applying the ultrasonic wave to the hold ring while pressing the hold ring to the first diameter contracted portion, the hold ring is welded to the first diameter contracted portion. Further, although the hold ring is moved in the pressing direction while being welded to the first diameter contracted portion, by stopping to apply the ultrasonic wave before the hold ring is brought into contact with the stepped portion formed between the first diameter contracted portion and the second diameter contracted portion, welding is carried out at the stepped portion to thereby prevent burrs from being produced. Further, burrs produced from the welded portion of the hold ring and the first diameter contracted portion are stopped by the stepped portion and sealed to inside of the groove in the ring-like shape and therefore, the burrs can firmly be prevented from flowing out to a side of the seal ring and the hold ring can fixedly be attached solidly to the inner periphery of the socket without damaging the seal ring.

BRIEF DESCRIPTION OF THE DRAWINGS

FIG. 2A is a disassembled perspective view and FIG. 2B is a perspective view showing a connected state.

FIG. 3A is a side view and FIG. 3B is a side sectional view.

FIG. 4A is a sectional view and FIG. 4B is a view partially enlarging a hold ring.

DETAILED DESCRIPTION OF THE PREFERRED EMBODIMENTS

Figure 1A:
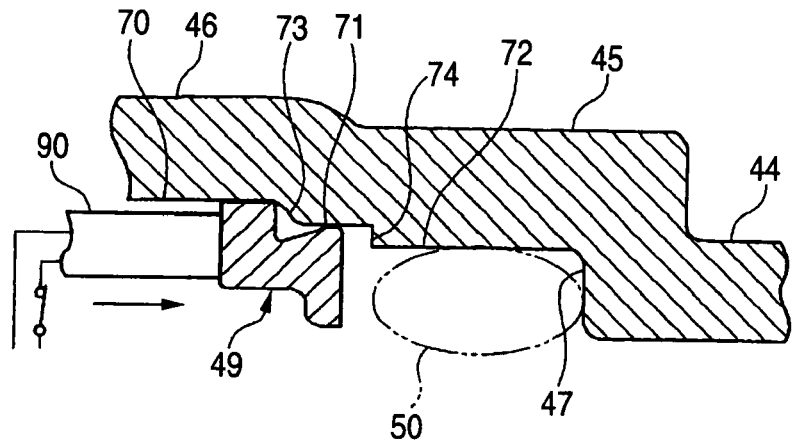
FIGS. 1A to 1C illustrate explanatory views showing a step of welding a hold ring according to an embodiment of a piping connector of the invention.
Figure 2A:
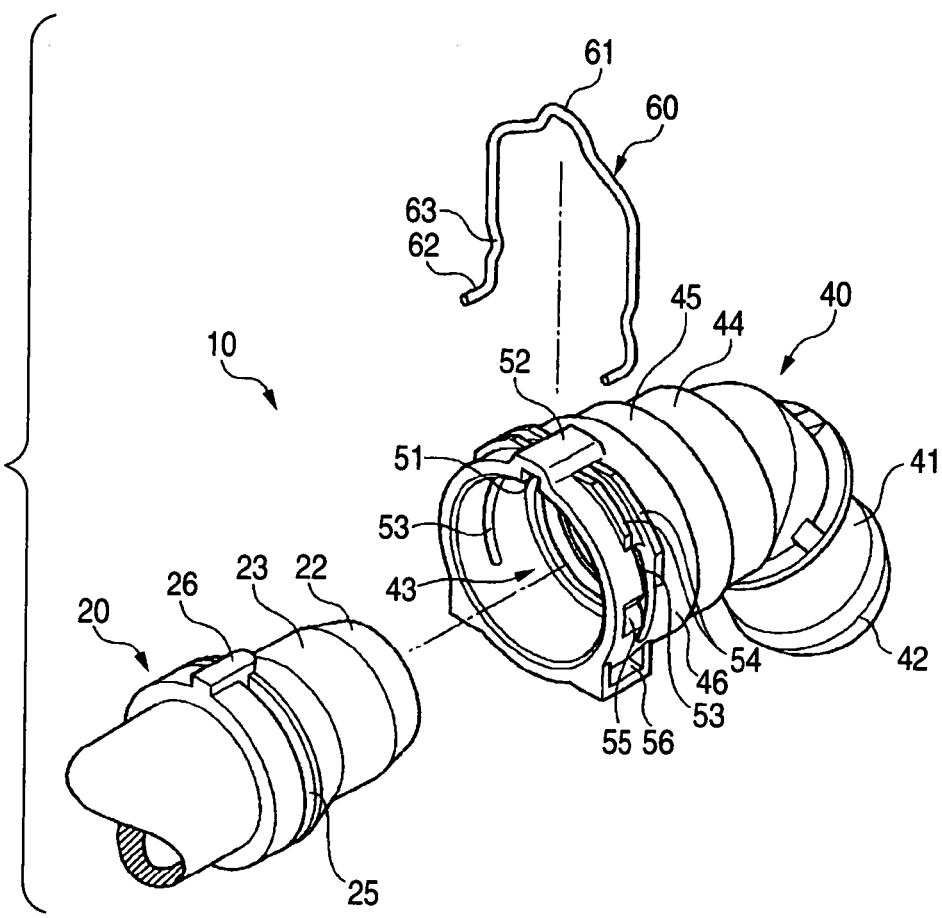
FIGS. 2A and 2B illustrate perspective views of the connector.
Figure 2B:
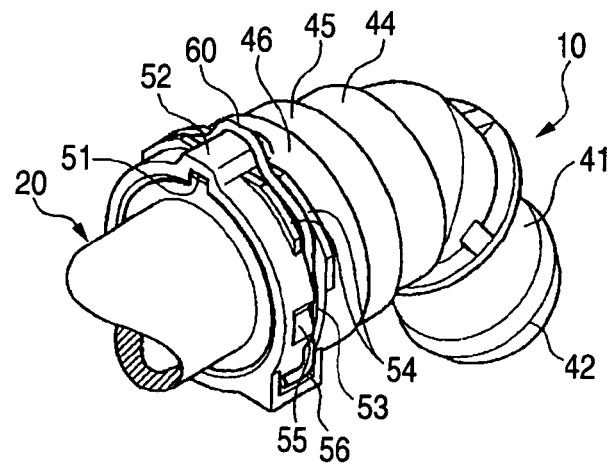
Figure 3A:
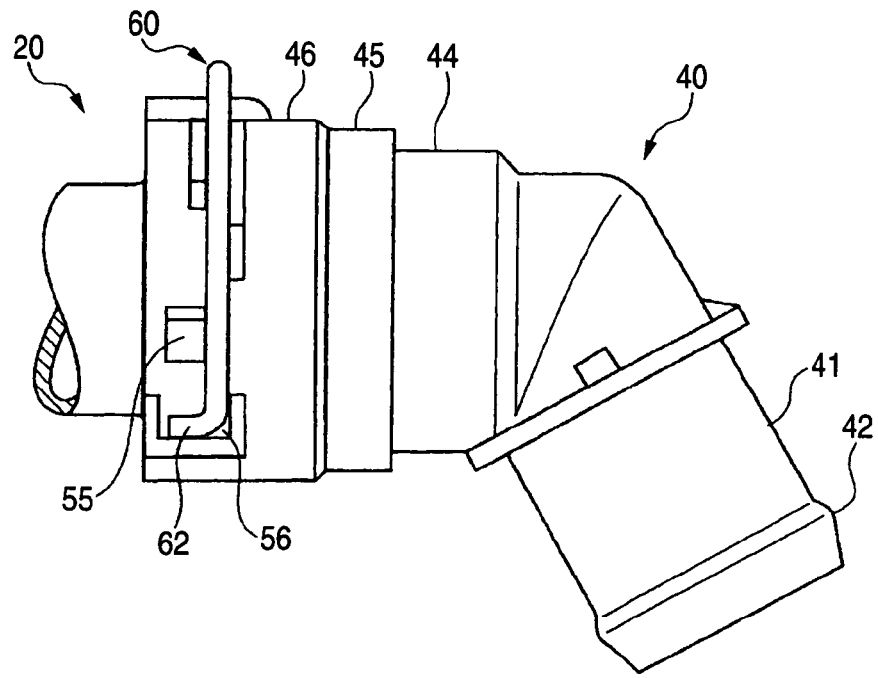
FIGS. 3A and 3B show the connected state of the connector.
Figure 3B:
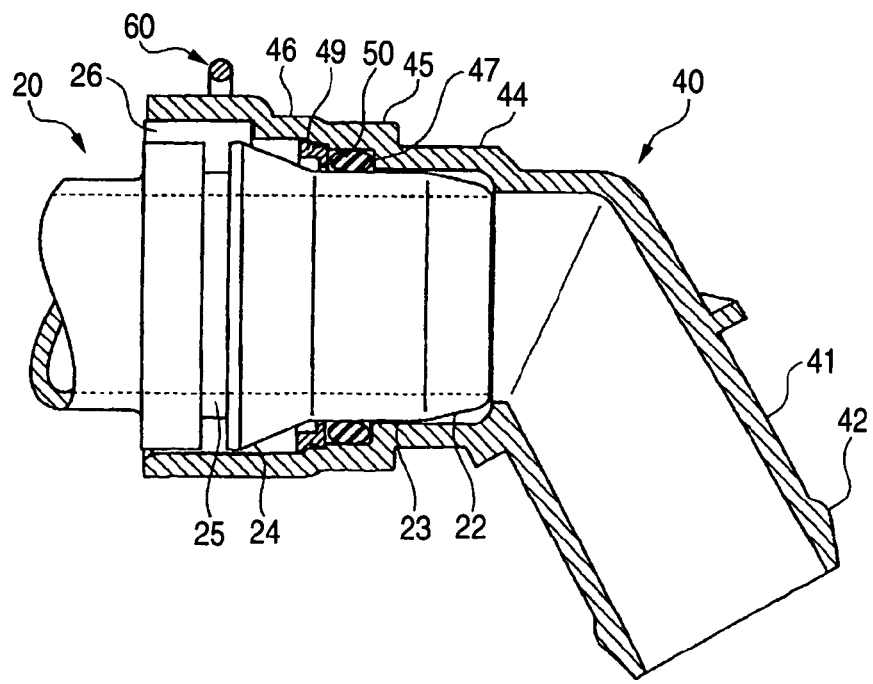
Figure 4A:
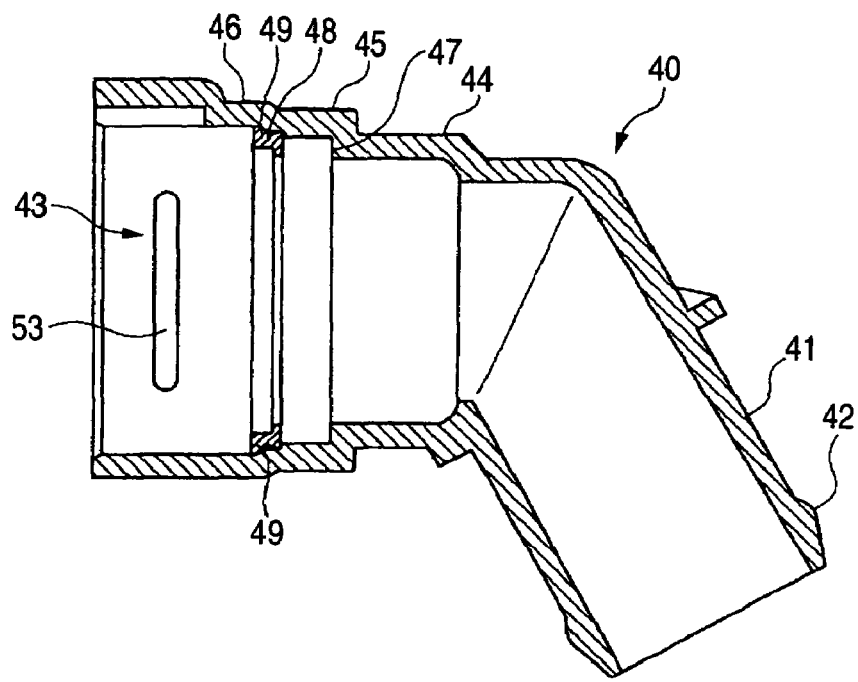
FIGS. 4A and 4B show a socket of the connector.
Figure 4B:
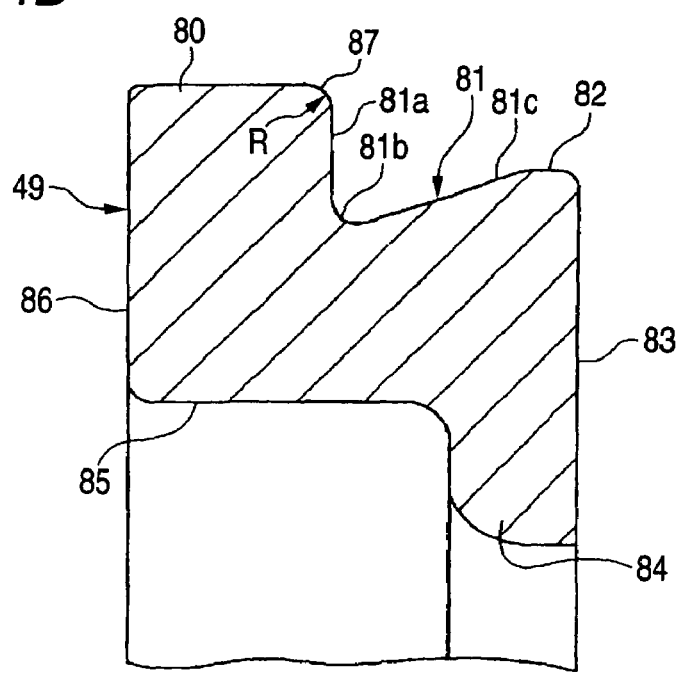

FIGS. 1A through 4B shows an embodiment of a piping connector according to the invention. FIGS. 1A to 1C are explanatory views showing a step of welding a hold ring of the connector, FIGS. 2A and 2B illustrate perspective views of the connector, FIG. 2A is a disassembled perspective view, FIG. 2B is a perspective view showing a connected state, FIGS. 3A and 3B illustrate a state of connecting the connector, FIG. 3A is a side view, FIG. 3B is a side sectional view, FIGS. 4A and 4B illustrate a socket of the connector, FIG. 4A is a sectional view, and FIG. 4B is a view partially enlarging a hold ring.

As shown by FIGS. 2A and 2B, the connector 10 is constituted by a plug first connecting means 20 substantially in a tubular shape attached to an end portion of one pipe to be connected, a socket second connecting means 40 substantially in a tubular shape attached to an end portion of other pipe, and a stopper 60 mounted to the socket 40 and formed by a bent wire.

The plug 20 constitutes a structure constituting a shape formed by making a first taper portion 22, a straight portion 23, and a second taper portion 24 continuous from a front end side thereof in a direction of being inserted into the socket 40 and formed with a ring-like groove portion 25 and a positioning projection 26 at an outer periphery of a ridge portion of the second taper portion 24.

Meanwhile, the socket 40 is provided with an attaching port 41 connected with other pipe to be connected, not illustrated, for example, a hose, a tube or the like at one end thereof and is provided with an inserting port 43 for receiving the plug 20 at other end thereof. The attaching port 41 is formed to bend by an angle of about 60 degrees relative to a socket main body portion to extend. A front end portion of the attaching port 41 is formed with a rib 42 in a ring-like shape to enhance an effect of preventing the pipe to be connected from being drawn.

The main body portion of the socket 40 constitutes a cylindrical shape in a size and in a shape for receiving the plug 20. Also in reference to FIGS. 3A to 4B, the main body portion of the socket 40 constitutes a shape for expanding a diameter thereof in steps and is provided with a first diameter expanded portion 44 having an inner diameter slightly expanded from the portion of being connected to the attaching port 41, a second diameter expanded portion 45 an inner diameter of which is slightly expanded from the first diameter expanded portion 44 and a third diameter expanded portion 46 a diameter of which is further expanded from the second diameter expanded portion 45.

Further, the first diameter expanded portion 44 of the socket 40 constitutes an inner diameter for inserting the first taper portion 22 and the straight portion 23. Further, a seal ring 50 arranged at the second diameter expanded portion 45 of the socket 40 is constituted by an inner diameter for being brought into close contact with the straight portion 23 of the plug 20. Further, the third diameter expanded portion 46 of the socket 40 is constituted by an inner diameter capable of containing the second taper portion 24, the ring-like groove 25 and the positioning projection 26 and the like of the plug 20.

Particularly as shown by FIG. 3B, FIG. 4A, at an inner periphery of the socket 40, a stepped portion 47 is formed between the first diameter expanded portion 44 and the second diameter expanded portion 45 and a hold ring holding means 49 is mounted between the second diameter expanded portion 45 and the third diameter expanded portion 46.

Further, the seal ring 50 is installed at a groove in a ring-like shape formed between the stepped portion 47 and the hold ring 49. That is, the seal ring 50 is held at a predetermined position by the stepped portion 47 and the hold ring 49.

In reference to FIGS. 2A and 2B again, the third diameter expanded portion 46 of the socket 40 is formed with a guide groove 51 for inserting the positioning projection 26 of the plug 20 and an outer periphery of the guide groove 51 constitutes a wall portion 52 which is bulged partially. The positioning projection 26 of the plug 20 is inserted into the guide groove 51 of the socket 40 to thereby restrict an angle of integrating the plug 20 and the socket 40.

The third diameter expanded portion 46 is formed with a notched groove 53 for inserting the stopper 60. The notched groove 53 is formed in a slit-like shape to penetrate inside and outside of the socket 40 along portions opposed to each other in a peripheral direction of the third diameter expanded portion 46.

An upper half portion of the notched groove 53 at the outer periphery of the third diameter expanded portion 46 is formed with a pair of ribs 54 projected from edge portions of the notched groove 53 opposed to each other and the ribs 54 pinches the stopper 60 to firmly hold. Further, a middle portion of the notched groove 53 at the outer periphery of the third diameter expanded portion 46 is formed with a recess portion 55 having a section in a V-like shape along the peripheral direction. Further, a lower end of the notched groove 53 at the outer periphery of the third diameter expanded portion 46 is formed with a containing recess portion 56 formed by a wall in a channel-like shape for containing an end portion of the stopper 60.

The stopper 60 is constituted by a wire or the like bent in a gate-like shape as a whole. A center portion of the stopper 60 is formed with an outwardly bent portion 61 matched to the outer periphery of the bulged wall portion 52. Both end portions of the stopper 60 are formed with forwardly bent portions 62 bent by substantially 90° to a side of the inserting port 43. Further, a portion of the stopper 60 slightly proximate to the base portion from the forwardly bent portion 62 is formed with an inwardly bent portion 63 bent to an inner side in a shape of a circular arc.

In mounting the stopper 60 to the socket 40, first, the stopper 60 is covered thereon from an upper side while widening the both end portions of the stopper 60 and while inserting the stopper 60 into the notched grooves 53 of the socket 40. Then, the forwardly bent portion 62 of the stopper 60 is fit to the recess portion 55 in the V-like shape at the outer periphery of the socket 40 and is tackedly held thereby. When the stopper 60 is further pressed strongly to a lower side under the state, the both end portions of the stopper 60 are slid while being widened further and the forwardly bent portions 62 are fit to the containing recess portions 56.

At this occasion, the both end portions of the stopper 60 are inserted into the notched grooves 53 of the socket 40, portions thereof are brought into a state of being projected from the inner periphery of the notched groove 53 to the inner side, particularly, the inwardly bent portions 63 are considerably projected to the inner side. At this occasion, each of the end portions of the stopper 60 traverses a circumference of the notched groove 53 as in a chord and is intersected with the notched groove 53 at two upper and lower portions thereof and the inwardly bent portion 63 is formed at a lower side intersected portion thereof.

Therefore, in connecting the piping connector 10, when the plug 20 is inserted into the socket 40 while inserting the positioning projection 26 of the plug 20 into the guide groove 51 of the socket 40, first, the first taper portion 22 of the plug 20 is brought into contact with inside of the seal ring 50 arranged at inside of the socket 40 and the plug 20 is pressed thereto while pressing the seal ring 50 to the inner wall of the socket 40. Next, the stopper 60 is brought into contact with the second taper portion 24 to rise on the second taper portion 24 while being pressed to widen. Further, after the stopper 60 has finished to rise on the second taper portion 24, the stopper 60 is dropped to fit to the groove 25 of the plug 20 to thereby finish to connect the plug 20 and the socket 40.

Although the piping connector 10 is provided with a basic structure as described above, a characterized portion of the invention resides in a structure of fixedly attaching the hold ring 49 to the inner periphery of the socket 40, that is, a structure of fixedly fixing the hold ring 49 to the inner periphery of the socket 40 by ultrasonic welding explained below.

Figure 1B:
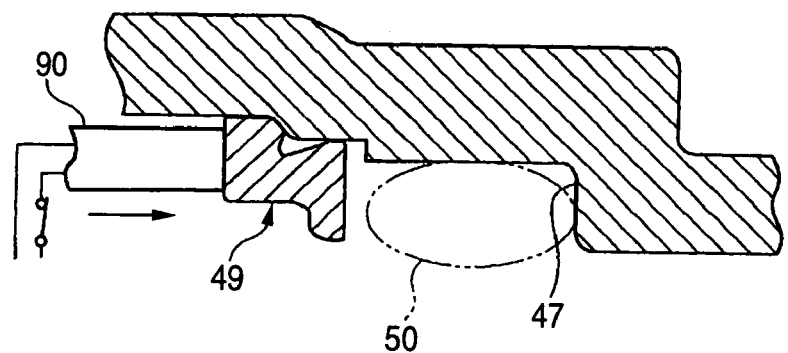
Figure 1C:
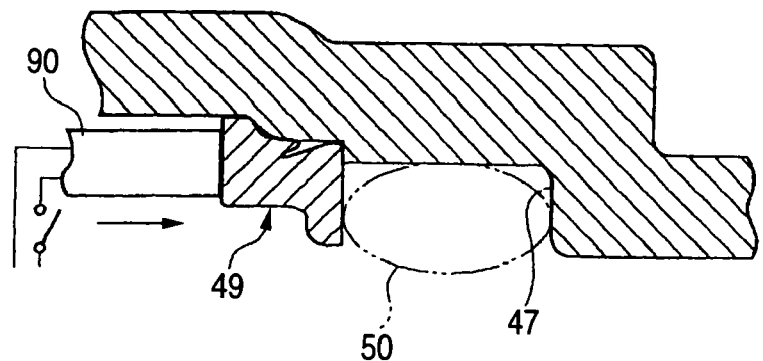

That is, as shown by FIGS. 1A to 1C, between the second diameter expanded portion 45 and the third diameter expanded portion 46 of the inner periphery of the socket 40, in view from a side of the inserting port 43, there are formed a first diameter contracted portion 71 a diameter of which is contracted from an inner periphery 70 of the third diameter expanded portion 46, and a second diameter contracted portion 72 a diameter of which is further contracted from the first diameter contracted portion 71. A first stepped portion 73 including a taper in a linear shape is provided between an inner periphery 70 of the third diameter expanded portion 46 and the first diameter contracted portion 71, and a second stepped portion 74 in a wall-like shape rising at right angle is formed between the first diameter contracted portion 71 and the second diameter contracted portion 72.

Further, also in reference to FIG. 4B, the hold ring 49 mounted to the inner periphery of the socket 40 is constituted by a large diameter portion 80 having an outer diameter substantially matched to the inner periphery 40 of the third diameter expanded portion 46, a groove 81 in a ring-like shape having a section in a V-like shape formed at an outer periphery of the large diameter portion or second end portion 80, a small diameter portion or first end portion 82 formed at an end portion of the ring-like groove 81, an end face 83 on a side of the small diameter portion 82, a rib 84 formed at an inner periphery in correspondence with the small diameter portion 82, an inner peripheral wall 85 formed on an inner peripheral side of the large diameter portion 80 contiguously to the rib 84, and an end face 86 on a side of the large diameter portion 80. The small diameter portion 82 constitutes an outer diameter matched to the inner periphery of the first diameter contracted portion 71.

Further, the groove 81 in the ring-like shape is provided with a wall portion 81a rapidly falling from the large diameter portion 80 to the inner peripheral side, and a wall portion 81c rising in a taper shape from a bottom portion 81b to the small diameter portion 82, and a corner portion 87 a section of which is faced in a shape of a circular ark is formed between the wall portion 81a and the outer periphery of the large diameter portion 80. The corner portion 87 constitutes a welded portion by being brought into contact with the first stepped portion 73 of the socket 40 in ultrasonic welding, mentioned later.

According to the invention, it is preferable that a radius of curvature R of the corner portion 87 for constituting the welded portion is made to be 0.2 through 0.5 mm. When the radius of curvature R is less than 0.2 mm, there is a concern of being chipped off in ultrasonic welding and when the radius of curvature R is larger than 0.5 mm, vibration energy is dispersed and therefore, welding can not be carried out smoothly.

FIGS. 1A to 1C shows a step of fixedly attaching the hold ring 49 to the inner periphery of the socket 40 by ultrasonic welding.

That is, as shown by FIG. 1A, first, the hold ring 49 is inserted from a side of the inserting port 43 to the inner periphery of the socket 40, the small diameter portion 82 is brought into contact with the inner periphery of the first diameter contracted portion 71 and the large diameter portion 80 is brought into a state being brought into contact with the inner periphery 70 of the third diameter expanded portion 46. Under the state, a horn 90 of an ultrasonic vibrator is brought into contact with the hold ring 49 to press the hold ring 49 as shown by an arrow mark in the drawing. Further, in FIGS. 1A to 1C in a state of vibrating the horn 90, the state is indicated by hatchings in a mesh-like shape and in a state of stopping vibration, the state is indicated by dispensing with the hatchings.

As a result, as shown by FIG. 1B, the corner portion 87 of the hold ring vibrated by the horn 90 is pressed to the first stepped portion 73 and a contact portion between the corner portion 87 and the first stepped portion 73 is melted by friction heat to weld. At this occasion, although a molten resin extruded from the welded portion constitutes burrs to flow out, the burrs are stored in the groove 81 in the ring-like shape and therefore, the burrs do not flow out to a side of the second diameter contracted portion 72 for constituting a containing portion of the seal ring 50.

Further, when vibration of the horn 90 is stopped before the end face 83 on the side of the small diameter portion 82 is brought into contact with the second stepped portion 74 and the hold ring 49 is further pressed by the horn 90, as shown by FIG. 1C, the end face 83 is brought into contact with the second stepped portion 74 by crushing to weld pieces of the molten resin and movement of the hold ring 49 is stopped. Under the state, the hold ring 49 is welded to the inner periphery of the socket 40 and therefore, a position of fixedly attaching the hold ring 49 can accurately be determined.

Further, the burrs by the molten resin extruded from the welded portion are stored at inside of the ring-like groove 81, the end face 83 of the hold ring 49 is finally brought into contact with the second stepped portion 74 and therefore, the burrs are completely sealed by the second stepped portion 74 and can further completely prevented from flowing out to the second diameter contracted portion 72 for constituting the containing portion of the seal ring 50.

According to the connector 10 of the invention fabricated in this way, the hold ring 49 of the seal ring 50 is fixedly attached to the inner periphery of the socket 40 by ultrasonic welding and therefore, the hold ring 49 is not stripped off from the inner periphery of the socket 40 and air tightness can excellently be maintained over a long period of time by holding the seal ring 50 at a correct position.

As has been explained above, according to the invention, the groove in the ring-like shape for constituting a burr storing space is formed at the outer periphery of the hold ring and therefore, the burrs produced in subjecting the hold ring to ultrasonic welding are stored in the groove in the ring-like shape and prevented from flowing out to the outside portion and therefore, it can be prevented that the burrs flow out to the side receive ring to damage the seal ring and the hold ring can fixedly be attached solidly to the inner periphery of the socket.

What is claimed is:

1. A piping connector for connecting a first pipe and a second pipe, said connector comprising:
    a socket having a tubular shape attachable to an end of the first pipe to be connected;
    a plug having a tubular shape attachable to an end of the second pipe;
    a seal ring arranged at an inner periphery of the socket for sealing an interval between the inner periphery of the socket and an outer periphery of the plug in an airtight manner; and
    a hold ring fixedly attached to the inner periphery of the socket for restricting the seal ring from moving in an axial direction,
    wherein the first pipe and the second pipe are connectable by inserting the plug to fit to the socket;
    wherein the hold ring comprises:
        a first end portion that faces toward the seal ring and that is fitted to the inner periphery of the socket;
        a second end portion that is positioned opposite to the first end portion and that is fitted to the inner periphery of the socket; and
        a groove that is formed between the first end portion and the second end portion, and
    wherein the groove of the hold ring and the inner periphery of the socket define a space therebetween so that, when the hold ring is welded, a burr is confined within the space.

2. The piping connector according to claim 1, wherein in welding of the hold ring, a portion of the hold ring fixedly attached to the inner periphery of the socket is constituted by a corner portion faced in a curved shape having a radius of curvature of 0.2 through 0.5 mm.

3. The piping connector according to claim 1, wherein the inner periphery of the socket is provided with a first diameter contracted portion and a second diameter contracted portion, and a stepped portion for constituting a stopper and a burr stopper in welding the hold ring is formed between the first diameter contracted portion and the second diameter contracted portion.

4. The piping connector according to claim 1, wherein a portion of the hold ring fixedly attached to the inner periphery of the socket includes a corner portion having a curved shape with a radius of curvature of 0.2 through 0.5 mm.

5. The piping connector according to claim 1, wherein the inner periphery of the socket comprises:
    a first diameter contracted portion;
    a second diameter contracted portion; and
    a stepped portion formed between the first diameter contracted portion and the second diameter contracted portion.

6. The piping connector according to claim 1, wherein said groove comprises a V shape.

7. The piping connector according to claim 1, wherein said groove is formed at an outer periphery of said second end portion, and said first end portion is formed at an end of said groove.

8. The piping connector according to claim 1, wherein said groove comprises a wall portion having a tapered shape.

9. The piping connector according to claim 1, wherein said groove comprises a wall portion having a tapered shape extending from a bottom portion of said groove to said first end portion.

10. The piping connector according to claim 1, wherein a portion of the hold ring fixedly attached to the inner periphery of the socket includes a corner portion having a curved shape with a radius of curvature sufficient to not disperse vibration energy generated by welding of the hold ring.

11. The piping connector according to claim 1, wherein said second end portion comprises an outer diameter substantially matched to an inner periphery of an inner portion of said socket.

12. The piping connector according to claim 1, wherein said first end portion comprises an outer diameter substantially matched to an inner periphery of an inner portion of said socket.

13. The piping connector according to claim 1, further comprising a stopper member mounted on said socket.

14. The piping connector according to claim 13, wherein said stopper member comprises a bent wire member.

15. The piping connector according to claim 1, wherein said plug comprises a position projection formed on an outer periphery of said plug.

16. The piping connector according to claim 1, wherein said socket comprises a position projection formed on an outer periphery of said socket.

17. The piping connector according to claim 1, wherein in welding of the hold ring, a portion of the hold ring fixedly attached to the inner periphery of the socket is constituted by a corner portion faced in a curved shape.

18. A piping connector for connecting a first pipe to a second pipe, said piping connector comprising:
    a socket attachable to an end of the first pipe;
    a plug attachable to an end of the second pipe; and
    a hold ring fixedly attached to an inner periphery of the socket,
    wherein the hold ring comprises:
        a first end portion that is fitted to the inner periphery of the socket;
        a second end portion that is positioned opposite to the first end portion and that is fitted to the inner periphery of the socket; and a groove that is formed between the first end portion and the second end portion, and wherein the groove of the hold ring and the inner periphery of the socket define a space therebetween so that, when the hold ring is welded, a burr is confined within the space.

19. A piping connector for connecting a first pipe to a second pipe, said piping connector comprising:

first connecting means attachable to an end of the first pipe;

second connecting means attachable to an end of the second pipe; and holding means attached to an inner periphery of one of said first connecting means and said second connecting means, wherein the holding means comprises:

a first end portion that that is fitted to the inner periphery of the first connecting means;

a second end portion that is positioned opposite to the first end portion and that is fitted to the inner periphery of the first connecting means; and a groove that is formed between the first end portion and the second end portion, and wherein the groove of the holding means and the inner periphery of the first connecting means define a space therebetween so that, when the holding means is welded, a burr is confined within the space.

* * * * *